Figure 3:
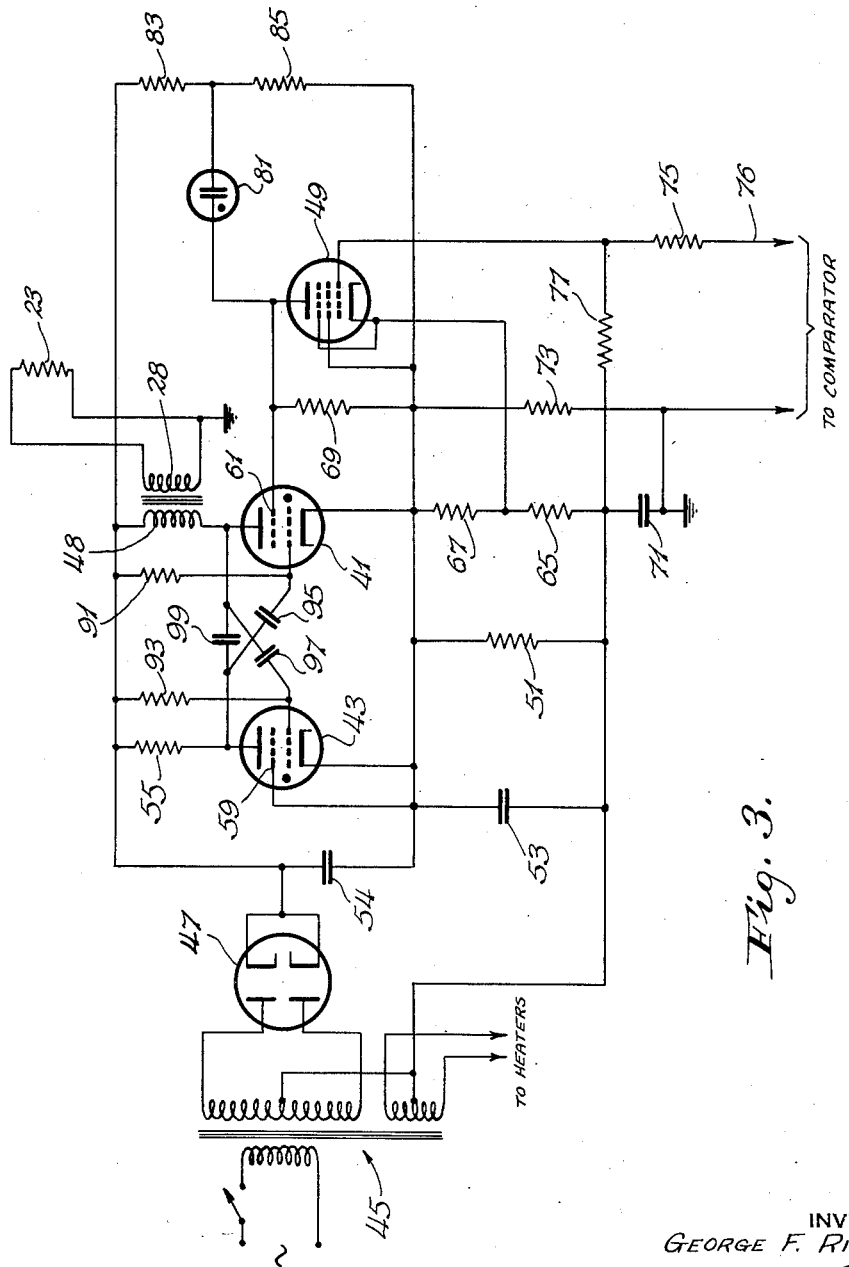

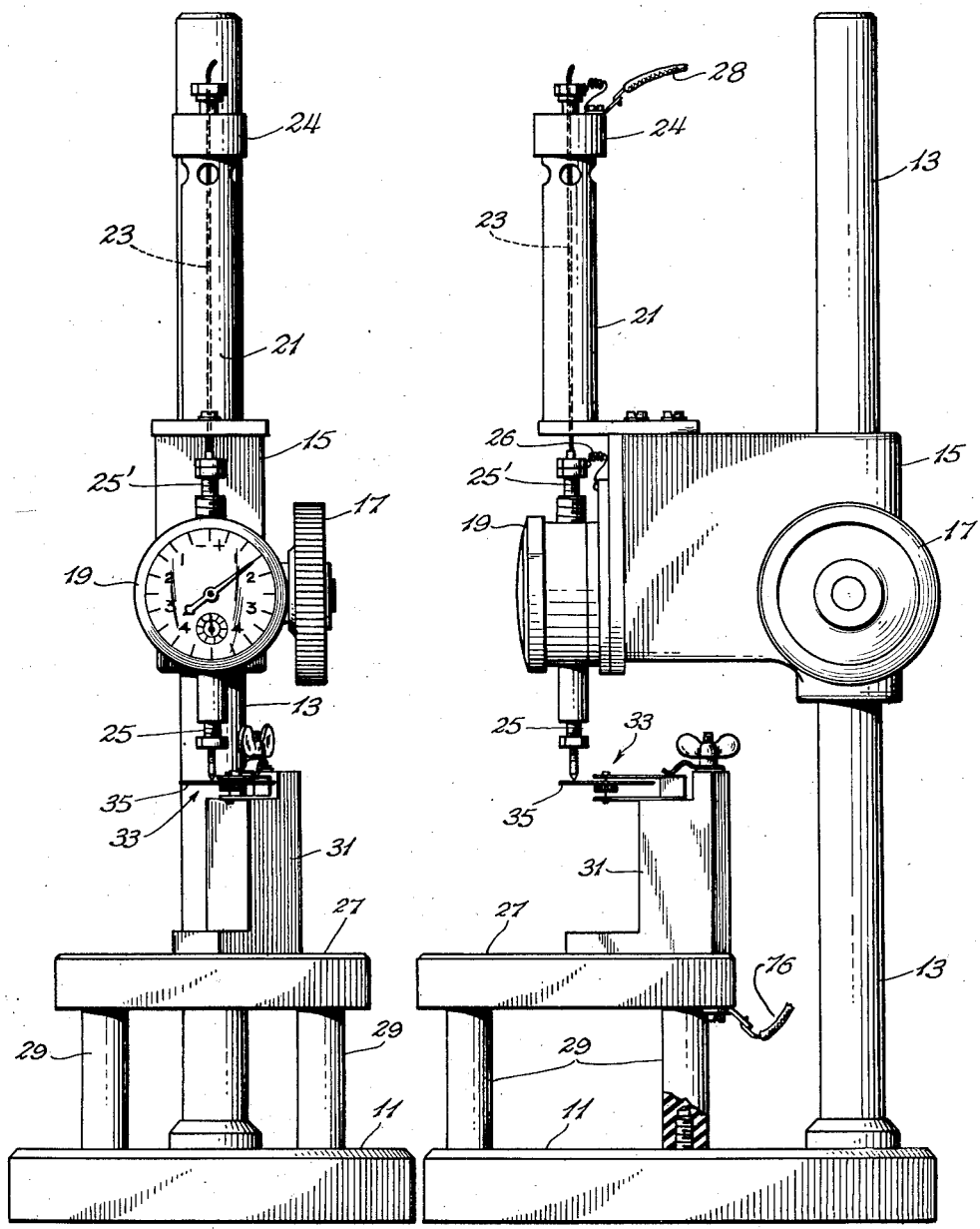

Jan. 11, 1955   G. F. RICHARDS   2,699,000
PRECISION GAUGE OF EXTREMELY HIGH SENSITIVITY
Filed Sept. 21, 1950   2 Sheets-Sheet 2

INVENTOR
GEORGE F. RICHARDS
BY
Thomas W. Ferrill, Jr.
ATTORNEY

United States Patent Office 2,699,000
Patented Jan. 11, 1955

2,699,000
PRECISION GAUGE OF EXTREMELY HIGH SENSITIVITY

George F. Richards, Garden City, N. Y., assignor to Teletronics Laboratory, Inc., Westbury, N. Y., a corporation of New York Application September 21, 1950, Serial No. 186,041

12 Claims. (Cl. 33—172)

The present invention relates to precision measuring apparatus, and is particularly concerned with apparatus for accomplishing measurements of extremely small dimensions with substantial freedom from forces exerted on the device or material under measurement.

It is well known to employ micrometer calipers and gauges for measurements to the nearest thousandth of an inch, as for measuring plates, straps, rods, wires and various machined and milled products. Instruments of this type suffer two kinds of limitations, however, the first being the limitation of their indicating precision, and the other being the appreciable forces acting between the instrument and the work, which sometimes cause so much deformation as to produce appreciable indicated error.

An instrument which surpasses the micrometer caliper, or "micrometer" as it is frequently called, in expansion of its scale and readability to very small dimensional variations is the "dial indicator". This instrument, like the "micrometer," is a well known tool of precision machinists. It includes a case resembling a watch case, and a dial and centrally pivoted pointer. A through-shaft or traverse member is arranged for longitudinal movement in precision bearings, transversely through the case. This shaft or traverse member is provided with rack teeth operating through a gear train to produce extensive angular movements of the pointer with very minute linear movements of the through-shaft, and of proportionate extent. The shaft and the gear train are both spring loaded, to retain the shaft and pressed firmly against the surface of the work, and to render the gear train substantially free from backlash or "dead-zone" action.

This instrument is useful where employed for measurements on rugged forms or structures. Where it is necessary to measure delicate machine elements, however, such as a balance wheel of a wrist watch, the force exerted by the springs in the dial indicator is so great as to cause appreciable deflection of the balance wheel, rendering the readings substantially erroneous. This spring force cannot be eliminated or very greatly reduced, however, because the action of the parts of the dial indicator would be seriously impaired.

The basic object of the present invention is to provide measuring apparatus capable of measurement to minute dimensions, and yet substantially free from exertion of force on the object being measured.

This object is achieved by providing the mechanism of a dial indicator with an electro-thermally controllable suspension system, and arranging for control of the suspension system to provide substantial balance of the force in the suspension system and the internal forces of the dial indicator mechanism. A circuit is provided for variably heating the thermal suspension system in such a way as to provide that the dial indicator shaft barely contacts the object being measured.

Figs. 1 and 2 are front and side elevations of the dial indicator and thermal suspension unit of the present invention, and Fig. 3 is a diagram of the circuit arrangements used with the unit of Figs. 1 and 2.

Referring now to Fig. 1, the front elevation view, and Fig. 2, the side elevation view, this embodiment of the present invention comprises a base 11 and a column 13 rigidly supported thereby.

A vertically adjustable member 15 is provided on column 13, with a bore conformal to the column, and with a locking hand wheel 17 arranged to provide positive clamping of the member 15 at any desired position on the column 13.

A mechanical indicator 19, which preferably is a dial indicator reading in ten-thousandths of an inch, is rigidly attached to the vertically adjustable member 15, with its traverse member or the through-shaft 25 extending vertically downward.

A tubular member 21 is firmly attached to the vertically shiftable member 15, extending upward therefrom directly above the movable element of the indicator 19, with its axis aligned therewith. Along the axis of the tube 21 is provided a thermally expansible wire 23 which may be a very slender strand of Nichrome, for example. The wire 23 is attached at its lower end to the upward extension 25' of the dial gauge traverse member 25, and arranged to exert force thereon in tension. The upper end of the wire 23 is anchored in a contact element which in turn is supported on an insulating block 24 fixed to the top of the tube 21. A positive connection between the lower end of the wire 23 and the metal framework is provided by a pigtail connection 26 extending between the traverse member extension 25' and the vertically movable member 15.

A table 27 is provided for supporting a jig or other electrically conductive seating device 31 on which, in turn, is provided the work piece on which the measurements or standardizing tests are to be performed. The table 27 preferably comprises a metal top plate securely mounted on pillars 29 of high quality insulating material, the pillars 29 being in turn securely anchored to the base 11.

The jig or seating means 31 is illustrated as supporting a framework 33 wherein is included a very delicate wheel 35, which, for example, might be the balance wheel of a watch.

As is well known, the dial indicator 19 includes therein a spring system tending to urge the probe end of the lateral traverse member 25 directly downward from the dial gauge. Accordingly, in order for the gauge to be able to make measurements, ordinarily, it is necessary for the work piece to offer sufficient resistance to the probe of the dial gauge to enable it to operate properly, and this must be accomplished without undue deformation of the work piece. The sensitivity of the dial gauge for use in measurements on extremely delicate instruments is therefore limited.

In accordance with the present invention, the force exerted by the spring within the dial gauge mechanism is counteracted by tension in the thermally expansible wire 23. Circuit arrangements are provided for heating the wire 23 just enough to permit the probe 25 to descend into extremely light contact with the surface of the work piece. These circuits include an electronic input system arranged to limit the heating of the wire 23 while the resistance of the contact between the probe and the work piece is extremely high—a resistance value of several megohms. This resistance value is achieved with extremely low contact pressure.

The circuit of the apparatus components for applying power to the wire 23 and for controlling the energization thereof according to contact resistance between the probe 25 and the work piece 35 is illustrated in Fig. 3.

In this circuit, a pair of thyratron tubes 41 and 43 having their grid and anode circuits cross-coupled are arranged as an inverter circuit for producing oscillations at a frequency which, for example, may be 300 cycles per second. The inverter comprising these tubes 41 and 43 is supplied with direct-current power by a power transformer 45 and full-wave rectifier 47 with filter condensers 53, 54 connected in the output circuit thereof.

A step-down transformer 48 is provided in the anode circuit of thyratron 41, with a low impedance secondary winding 28 for matching the output thereof to the very low impedance of the taut wire 23, an impedance value which may be of the order of 2 ohms.

An amplifier tube 49 is provided for effecting on-off control of the inverter, according to the resistance between the stylus 25 and the work 35.

The principal portions of the load for the transformer and rectifier 45 and 47 comprise a series combination of resistor 51 and the inverter including tubes 41 and 43. Filter capacitor 53 is provided in shunt with resistor 51, and further filter capacitor 54 is provided in shunt with the power supply load portion including the inverter-thyratrons 41 and 43.

These thyratrons have unequal anode loads, the load for tube 43 being a resistor 55 of an appreciable resistance value, and the load for thyratron tube 41 being the primary winding of transformer 48 coupled to the resistance wire strand 23.

A substantial portion of the direct output voltage produced by the transformer and rectifier system is developed across capacitor 54, and the remainder of the voltage, being also a substantial portion thereof, is developed across capacitor 53, the positive side of capacitor 53 being joined to the negatively charged side of capacitor 54 and to the cathodes of tubes 41 and 43.

The shield grid 59 of thyratron 43 is connected to the cathode thereof, whereas the shield grid 61 of thyratron 41 is connected to the anode of the pentode control tube 49.

The cathode of control tube 49 is supplied through a voltage divider 65, 67, at a high positive potential with respect to the negative terminal of capacitor 53 and center tap of the high voltage secondary winding of transformer 45. The screen grid of tube 49 is supplied at the potential of the cathodes of the thyratrons 41 and 43, and the anode of tube 49 is supplied through a relatively high-resistance anode load resistor 69 from this same positive supply point relative to the cathode potential of the tube 49.

The control grid circuit for the tube 49 includes a capacitor 71 having a grounded terminal coupled to the cathodes of the thyratrons through a relatively low resistor 73. A connection is made from the contact seating means 31 through the insulated table 27, through a relatively high-value resistor 75, to the control grid of tube 49, and a further high resistor 77 is provided between the control grid and the negative terminal of capacitor 71 which is connected in common with the negative terminal of capacitor 53 and the center tap of the high voltage secondary winding of transformer 45.

A neon tube indicator 81 is connected at one terminal to the anode of control tube 49, and at its opposite terminal to the junction of a voltage divider resistor system comprising resistors 83 and 85.

The R-C intercoupling circuits in the inverter include grid resistors 91 and 93 and capacitors 95, 97 and 99.

Assuming the absence of work from the jig or contact seating means 31, so that there is no metal object for the traverse member 25 to come into contact within the limits of its travel, there is an open circuit condition between the junction of the grounded terminal of capacitor 71 and resistor 73 and the lower terminal of resistor 75 which is connected to the table 27 by conductor 76.

Under these conditions, the control grid of tube 49 is at high negative potential relative to its cathode, by the amount of the voltage drop across resistor 65. This prevents the flow of current from the cathode to the anode of tube 49, so that the anode is at the same potential as the cathode of thyratron 41. Accordingly, thyratron 41 is free to operate as is also thyratron 43, and, by virtue of the resistance-capacitance cross-coupling circuit therebetween, these tubes produce square-wave oscillations at a frequency of substantially 300 cycles per second.

A substantial portion of the 300-cycle alternating wave energy produced by the operation of the circuit including thyratrons 41 and 43 is coupled through transformer 48 to the slender wire 23, to cause heating thereof. As this wire is heated, it expands and yields to the spring included in the mechanism of dial indicator 19, arranged to urge the traverse member 25 downward.

If the work 35 were not present beneath the stylus 25, the inverter would continue to run, and the wire would be heated to the extent to permit very substantial downward travel of the traverse member. But with the work in position in the jig 31 with the portion on which measurements are to be performed resting just beneath the contact end of the traverse member 25, the latter is permitted to descend and come into very light contact with the work 35 by virtue of the heating and resultant elongation of the wire 23.

As the stylus end of the traverse member 25 reaches very light contact with the work 35, electric contact is made therewith, the resistance of the contact of course decreasing as the pressure increases. The voltage supply in the grid circuit including capacitor 71 and resistor 75 is such, and the resistance values are so high that the contact resistance need only come down to the order of 50 megohms in order to overcome the high negative bias of the control grid of tube 49 and cause anode current conduction therethrough. Thereupon, the potential of the anode of tube 49 and the shield grid 61 of thyratron 41 are greatly decreased, with the result that thyratron 41 is prevented from conducting current upon the next ensuing half cycle wherein it would have become conductive.

Accordingly, the anode circuits of thyratrons 41 and 43 are brought to quiescent conditions, until the wire 23 cools to the extent to reduce the contact pressure of the stylus 25 on the work 35 very slightly, letting the resistance therebetween increase appreciably, and returning tube 49 to the anode current cut-off condition and likewise restoring thyratron 41 to full operation in the inverter circuit.

The cycle of inverter operation and inverter quiescence is repeated again and again, the system alternating between these two conditions at a frequency appreciably lower than the inverter operation frequency, which, as aforementioned, is of the order of 300 cycles per second.

The actual physical motion of the traverse member 25, though tending to be oscillatory as a result of the type of operation described above, is so minute that the indicator needle remains substantially stationary, and the reading provided thereby is extremely accurate, with the almost total freedom from pressure against the work.

The frequency of oscillation in the dual thyratron inverter circuit is made sufficiently high to insure that the thyratron control, which may lag up to one cycle behind the application of negative voltage to the shield grid 61 of tube 41, is nevertheless extremely prompt in its responsiveness to change of resistance at the stylus contact, and the thermal inertia of the wire strand 23 is so low that the wire contracts enough in a very small fraction of a second to restore sufficiently high resistance in the contact between the work and the stylus end of the traverse member, to bring tube 49 back to the cut-off condition and restore operation in the inverter circuit. Thus, the inverter operates for a few cycles and is off for an interval of time, and this cycle of operation is repeated many times within one second, at such a high repetition rate that the dial indicator does not appear to have any pointer movement whatever while the probe is in its slightly oscillatory contact with the work.

The neon indicator 81 is arranged to have insufficient voltage thereacross for illumination during the time when tube 49 is cut-off, but to have sufficient voltage for illumination when the anode voltage of tube 49 drops as a result of the decreasing contact resistance as the stylus comes in contact with the work. Thus, the illumination of the indicator 81 serves to signal that the stylus has arrived at the contact condition.

A table of tube types and resistor and capacitor values is included below showing typical values for a fully operative circuit.

Resistors:
| | | |
|---|---|---|
| 51 | ohms | 1,500 |
| 55 | do | 5,000 |
| 65 | do | 2,200 |
| 67 | do | 33,000 |
| 69 | do | 220,000 |
| 73 | do | 3,300 |
| 75 | do | 2,200 |
| 77 | megohms | 6.8 |
| 83 | ohms | 220,000 |
| 85 | do | 51,000 |
| 91 | megohms | 2.2 |
| 93 | do | 1.8 |

Capacitors:
| | | |
|---|---|---|
| 53 | mfd | 4 |
| 54 | mfd | 4 |
| 71 | mfd | 5 |
| 95 | mfd | .002 |
| 97 | mfd | .001 |
| 99 | mfd | .1 |

Tubes:
| | |
|---|---|
| 41 | 2D21 |
| 43 | 2D21 |
| 47 | 6X4 |
| 49 | 6AU6 |

As many changes could be made in the above construction and many apparently widely different embodiments of this invention could be made without departing from the scope thereof, it is intended that all matter contained in the above description or shown in the accompanying drawings shall be interpreted as illustrative an not in a limiting sense.

I claim:

1. Sensitive gauge apparatus comprising a dial indicator having a spring-urged movable traverse member, power-responsive electrically controllable means coupled to said traverse member for opposing the spring force on said movable traverse member and limiting the extension of said movable traverse member, means for insulatingly supporting a device to be measured in the range of movement of said traverse member, said last-named means including contact seating means for the device to be measured, and means including an input circuit connected between said seating means and said traverse member and an output circuit connected to said power-responsive electrically controllable means for regulating the power in said controllable means to bring said traverse member into contact with the device to be measured and for restricting said traverse member to very high-resistance contact with the device, said power-responsive electrically controllable means comprising a strand of resistance wire in axial alignment with said traverse member, one end of said strand of resistance wire being connected to said traverse member and the opposite end of said strand of resistance wire being rigidly fixed in position with respect to said dial indicator.

2. Sensitive gauge apparatus comprising a dial indicator having a movable traverse member for contacting the object to be gauged, a strand of wire in alignment therewith, said strand of wire being connected at one end to said traverse member and being fixedly positioned at its opposite end with respect to said dial indicator, said dial indicator including means for urging said traverse member in the direction for retaining said strand taut, and means including an electronic amplifier circuit for supplying power to said strand, said amplifier circuit including an input voltage supply circuit having connections to said traverse member and the object to be gauged whereby the contact resistance of said traverse member is included in the input circuit of said amplifier.

3. Sensitive gauge apparatus as defined in claim 2, wherein said means including an electronic amplifier circuit for supplying power to said strand comprises a vacuum tube amplifier stage and a dual thyratron inverter circuit responsive to the output of said amplifier stage, said amplifier stage comprising means for disabling said inverter circuit when the contact resistance between said traverse member and the object being gauged is substantially lower than a predetermined very high resistance.

4. Sensitive gauge apparatus comprising a dial indicator having a movable traverse member and elastic means urging said traverse member outward, power-responsive electrically controllable means coupled to said traverse member and acting in force opposition to said elastic means for controlling the position of said traverse member, means including an electronic control circuit for supplying power to said controllable means, means for insulatingly supplying support for a device to be measured and for holding the device in position for said traverse member to come into contact therewith, said last-defined means including contact seating means for the device to be measured, said electronic control circuit including an electron discharge tube having a grid circuit connected to said traverse member and said contact seating means, and an inverter circuit coupled to said power-responsive electrically controllable means to supply alternating voltage output power thereto, said electron discharge tube having its output circuit coupled to said inverter circuit for controlling said inverter circuit according to contact resistance between said traverse member and the device in said contact seating means.

5. Sensitive gauge apparatus comprising a stand including a base and an upright portion, a dial indicator supported on said upright portion, said dial indicator including a traverse member extending downward perpendicularly toward said base, a tubular member rigidly supported directly above said traverse member, a strand of wire supported at its upper end by said tubular member and connected at its lower end to the top of said traverse member, said wire being axially aligned with said traverse member, and electrical means connected to said wire for passing current therethrough to control the downward projection of said traverse member.

6. Sensitive gauge apparatus as defined in claim 5, further including rigid seat means for receiving an instrument to be measured and fixedly supporting it below said traverse member, said last-named means including an insulating supporting structure for insulating the instrument to be measured from said base and upright portion.

7. Sensitive gauge apparatus as defined in claim 6, further including an inverter circuit having its output coupled to said wire for supplying alternating current heating power thereto, and an electron discharge amplifier having its input circuit connected between said traverse member and said seat means and its output circuit connected to control said inverter and to suspend alternating current output thereof upon attainment of a predetermined high resistance contact between said traverse member and the instrument supported on said contact seating means.

8. Sensitive gauge apparatus comprising a dial indicator having a traverse member therein, electrically extensible control means fixed at one point relative to said dial indicator and connected at another point to said traverse member, insulated seating means for supporting material or devices to be measured in position for contact with said traverse member, a dual tube inverter circuit comprising electron discharge devices having their control grid and anode circuits cross coupled, the anode circuit of one of said electron discharge devices being coupled to said electrically extensible means to supply power thereto, and an electron discharge device including an anode coupled to at least one of the electron discharge devices in said inverter circuit and a grid circuit normally biased to anode current cut-off and including connections to said seating means and said traverse member, whereby even very light contact between said traverse member and material supported by said contact seating means changes the resistance and bias in the grid circuit of said last-named electron discharge device to the extent to provide current conduction therethrough to cut off the alternating voltage output of said inverter.

9. Sensitive gauge apparatus comprising a sensitive indicator including a movable probe element for contacting the object to be measured, elastic means connected thereto for urging it into contact with the object to be measured, power-responsive electrically controllable tensile strand means connected to said probe element and opposing the force exerted by said elastic means for limiting the travel of said probe element, said power-responsive means comprising means responsive to electric power supplied thereto for varying the limiting position of said probe element according to the amount of power supplied to said strand means, and means including an amplifier having an input circuit coupled to said probe element to respond to the proximity thereof to the object to be measured and having an output circuit coupled to said power-responsive electrically controllable means for regulating the position of said probe element.

10. Sensitive gauge apparatus comprising a sensitive indicator including object seating means and a movable probe element and indicator means coupled thereto for indicating the position thereof, means for urging said probe element into contact with the object to be measured, linearly extensible electric power responsive strand means coupled to said probe element for resisting the force of said urging means and limiting the position of said probe element, said linearly extensible means being fixedly anchored at one point thereof and being coupled at another point to said probe element, and means including an amplifier having an input circuit connected to said object seating means and said probe element and an output circuit coupled to said linearly extensible means for regulated energization thereof, said linearly extensible means varying in length in a predetermined relation to the intensity of electric energization thereof.

11. Sensitive gauge apparatus as defined in claim 10, wherein said means including an amplifier comprises a thyratron inverter circuit for generating alternating voltage for energization of said linearly extensible means, and control circuit means for selectively limiting the alternating voltage generation of said inverter circuit as said probe element comes in contact with the object to be measured.

12. Sensitive gauge apparatus comprising a sensitive indicator including a movable probe element for contacting the object to be measured, a rigid frame structure establishing a fixed suspension point, a strand of resistive wire extending from said suspension point and coupled to said probe element, means urging said probe element in the direction away from said suspension point for maintaining said strand in tension, means including an amplifier and having a signal input circuit and a power output circuit for variably energizing said strand of wire, means connecting said output circuit to said strand of wire, and means for coupling said input circuit to said probe element and the object to be measured.

References Cited in the file of this patent

UNITED STATES PATENTS

| Number | Name | Date |
|---|---|---|
| 2,210,970 | Bonell | Aug. 13, 1940 |
| 2,294,831 | Carson | Sept. 1, 1942 |
| 2,437,639 | Floyd | Mar. 9, 1948 |
| 2,477,085 | Rieber | July 26, 1949 |
| 2,510,822 | Jacot et al. | June 6, 1950 |